US008626854B2

(12) United States Patent
Varvello et al.

(10) Patent No.: US 8,626,854 B2
(45) Date of Patent: Jan. 7, 2014

(54) TRAFFIC LOCALIZATION IN PEER-TO-PEER NETWORKS

(75) Inventors: Matteo Varvello, Port Monmouth, NJ (US); Moritz Steiner, Red Bank, NJ (US)

(73) Assignee: Alcatel Lucent, Paris (FR)

( * ) Notice: Subject to any disclaimer, the term of this patent is extended or adjusted under 35 U.S.C. 154(b) by 109 days.

(21) Appl. No.: 13/007,885

(22) Filed: Jan. 17, 2011

(65) Prior Publication Data
US 2012/0185541 A1 Jul. 19, 2012

(51) Int. Cl.
*G06F 15/16* (2006.01)
(52) U.S. Cl.
USPC ........... 709/206; 709/223; 709/238; 709/243; 709/224
(58) Field of Classification Search
None
See application file for complete search history.

(56) References Cited

U.S. PATENT DOCUMENTS

| 7,089,301 | B1 | 8/2006 | Labio et al. | |
| 7,509,312 | B2 * | 3/2009 | George et al. | 1/1 |
| 7,571,251 | B2 * | 8/2009 | Bowman | 709/242 |
| 7,958,195 | B2 * | 6/2011 | Beigi et al. | 709/206 |
| 7,970,820 | B1 * | 6/2011 | Sivasubramanian et al. | 709/203 |
| 7,979,414 | B2 * | 7/2011 | George et al. | 707/706 |
| 8,180,853 | B2 * | 5/2012 | Lee et al. | 709/218 |
| 2002/0138552 | A1 * | 9/2002 | DeBruine et al. | 709/203 |
| 2010/0185753 | A1 * | 7/2010 | Liu et al. | 709/219 |
| 2011/0060798 | A1 * | 3/2011 | Cho et al. | 709/206 |

FOREIGN PATENT DOCUMENTS

EP 2 317 727 5/2011

OTHER PUBLICATIONS

Maymounkov et al. A peer-to-peer Information System Based on the XOR Metric.
Yang Guo et al., "PONDER: Performance Aware P2P Video-on-Demand Service", Global Telecommunications Conference, 2007. Globecom '07. IEEE, IEEE, Piscataway, NJ, USA, Nov. 1, 2007, pp. 225-230.
International Search Report dated Apr. 4, 2012, issued in Application No. PCT/US2012/020779.

* cited by examiner

*Primary Examiner* — Liangche A Wang
*Assistant Examiner* — Abdulkader M Alriyashi
(74) *Attorney, Agent, or Firm* — Harness, Dickey & Pierce (57) ABSTRACT

Provided is a method for localizing peer-to-peer traffic. The method includes transmitting, by a first node of a peer-to-peer network, a first message to one or more other nodes associated with the peer-to-peer network. The message includes a request for content and a deadline for when the content is to be received by the first node.

15 Claims, 10 Drawing Sheets

Related Art

| Type  | Header   |      |      | Data     |                     |
|-------|----------|------|------|----------|---------------------|
| Bytes | 1        | 4    | 1    | 4        | Variable            |
| Name  | Protocol | Size | Type | Deadline | Parsed Search String |

FIG. 4A

| Type  | Header   |      | Data     |              |
|-------|----------|------|----------|--------------|
| Bytes | 1        | 1    | 4        | Variable     |
| Name  | Protocol | Type | Deadline | File ID List |

TRAFFIC LOCALIZATION IN PEER-TO-PEER NETWORKS

BACKGROUND OF THE INVENTION

Embodiments relate to peer-to-peer file sharing networks and a method for localizing peer-to-peer traffic.

DESCRIPTION OF THE RELATED ART

Some versions of peer-to-peer file sharing networks rely on a centralized computer or network of network elements to list all of the available content in the network. Other peer-to-peer file sharing networks do not rely on centralized components to list all of the available content on a network. Rather, the directory is distributed as the content itself is distributed. The technique used to distribute the directory database on all participating clients is sometimes referred to as a distributed hash table (DHT).

Whether the network is a centralized type network or a network using a DHT, peers download content from one peer to another without regard to the locality of a peer from which content is shared. As a result, if a peer requests a file contained on another peers' computer, the computer containing the file may be located far away from the peer requesting the file. This results not only in file transfer delays, but increased cost as the link between the peers must go through one or more internet service providers (ISPs). Thus, such peer-to-peer type of connections can create a large amount of traffic on transit links linking ISPs together, thereby increasing costs to network operators.

For example, assume there is a popular content file and that there are 10,000 users world-wide that have this file on their computers. Assume 50 of those 10,000 users may be located within a given ISP "A". Assume a peer within ISP "A" is interested in the popular file and requests the directory, either the centralized or DHT type directory for 50 random peers from which to download the file. In such an instance there is a chance of 0.5% of finding a single peer within ISP "A." There is a chance close to zero that if 50 peers having the file are randomly identified to the requesting peer, that all 50 peers will be inside ISP "A."

In such a scenario, while there are an ample number of peers within the same ISP as the peer requesting the file, the chances are that the peer will end up receiving the file from a peer located outside the requesting peers' ISP. This requires unnecessary traffic on a transit link between ISPs.

Figure 1:
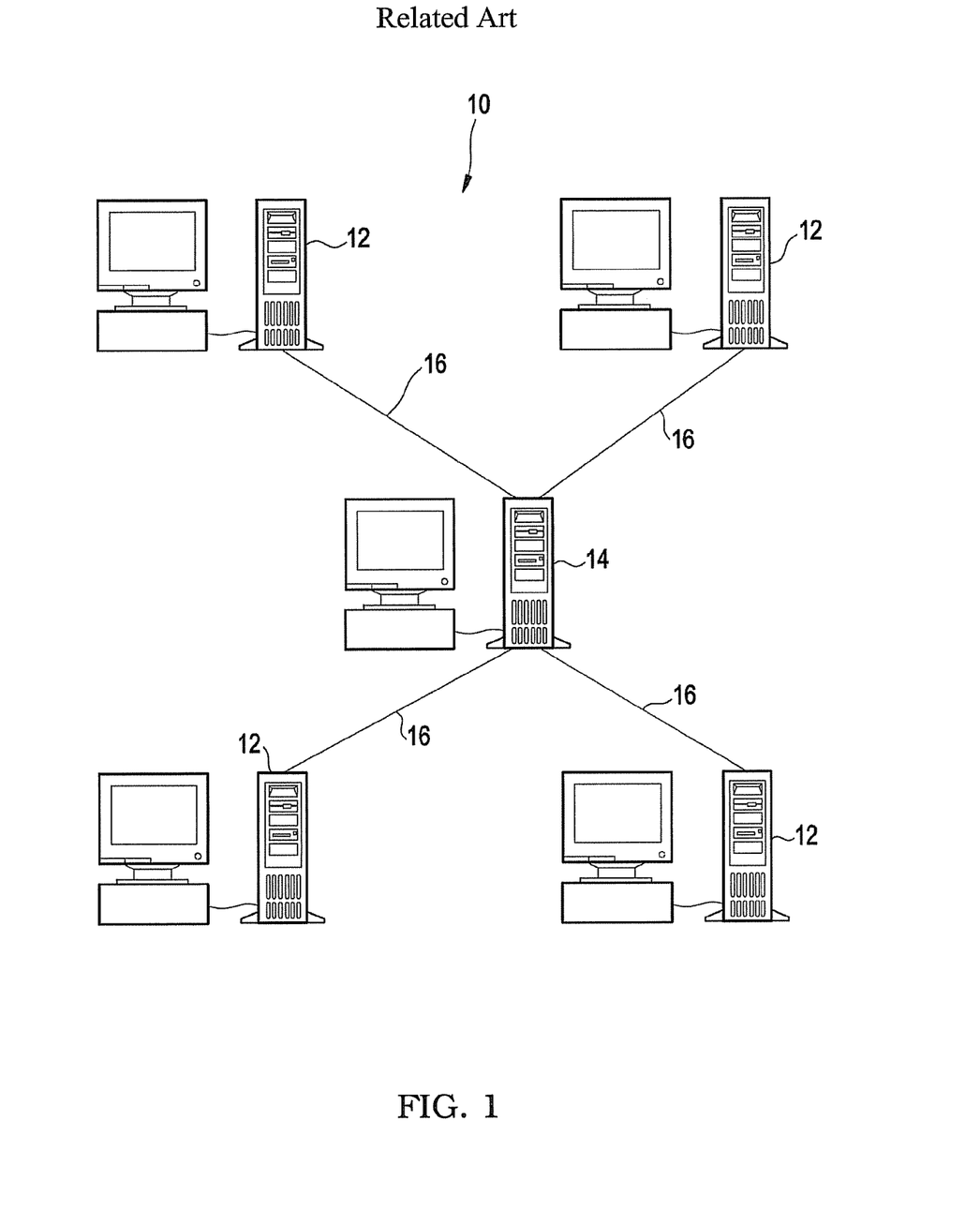
FIG. 1 illustrates a related art schematic diagram of a peer-to-peer file sharing network having centralized components.

FIG. 1 shows a schematic diagram of centralized peer-to-peer system 10. The centralized peer-to-peer system 10 includes computers 12 which are also referred to as peers and/or nodes 12 and a central computer 14. The peers and/or nodes 12 are connected to the central computer 14 via connections 16. The connections 16 may be any suitable connection such as wireless connection, Ethernet connection or combination of any suitable connection hardware or methods.

While the peer-to-peer system 10 shows only four peers and/or nodes 12 and a single central computer 14, it is to be understood that a peer-to-peer system is not limited to the number of peers and/or nodes 12 shown and central network component of a single central computer 14. In fact, the peer-to-peer system 10 may include many more peers and/or nodes 12 and many computers, servers or other components may accomplish the tasks of the central computer 14 shown.

In a centralized peer-to-peer system 10 as shown in FIG. 1, when a peer and/or node 12 requests content or a file, the request is sent via the connection 16 to the centralized computer 14. Sending requests are well known in peer-to-peer networks.

The centralized computer 14 determines what peers and/or nodes 12 have the requested content and may respond to the request with information regarding what peers and/or nodes 12 have the requested content. The centralized computer 14 may identify several peers and/or nodes 12 having the requested content and respond with information regarding multiple identified peers and/or nodes 12. Once a peer and/or node 12 or peers and/or nodes 12 is/are indentified, the requesting peer may then receive the requested file from one of the identified peers.

The centralized computer 14 may make a determination of which peers and/or nodes 12 among many peers and/or nodes 12 that may contain the requested content that should be identified to the requesting peer in order to reduce large amounts of data being transmitted over transit links. These decisions may be made to localize peer-to-peer traffic. This determination will be described in more detail later below.

For example, one well known file sharing system for peer-to-peer networks is known as BITTORRENT™, registered to BitTorrent Inc. The mechanisms the BITTORRENT file sharing system uses to discover peers impact the structure of the P2P network and consequently the data dissemination. Thus, the knowledge of the peer discovery in the BITTORRENT file sharing system is fundamental for a clear understanding of traffic localization. The BITTORRENT file sharing system employs a tracker or central server (e.g., centralized computer 14) in order to discover peers and coordinate file exchanges. Peers retrieve the address of the tracker within a torrent they download from the web. A ".torrent" is a meta data file that contains useful information for the file exchange.

Initially, a peer contacts the tracker to retrieve a list of peers that hold the file or a portion of it. The tracker answers with the peer-list, a random subset of active peers generally composed by 50 peers. Afterwards, a peer interacts with the tracker regularly in order to send information about the volume of bytes the peer has downloaded or uploaded. In response, the tracker sends to the peer a new peer-list. The frequency of communications between the client and the tracker is regulated by the tracker via a min interval field contained in the tracker replies. Generally, it is set to 15 minutes.

As indicated above, the peer-list is a random subset of active peers. The peer-list in no way includes localization of peers within a network (e.g., an Internet service provider network (ISP) network). Some efforts have been made to leverage the tracker or central server (e.g., centralized computer 14) for localization. However, these efforts are outside the scope of this disclosure.

SUMMARY OF THE INVENTION

One embodiment includes a method for localizing content in a peer-to-peer network. The method includes transmitting, by a first node of a peer-to-peer network, a first message to one or more other nodes associated with the peer-to-peer network. The message includes a request for content and a deadline for when the content is to be received by the first node.

Another embodiment includes a method for localizing content in a peer-to-peer network. The method includes receiving, by a first node of the peer-to-peer network, a first message from a second node associated with the peer-to-peer network. The first message includes a request for content and a deadline for when the content is to be received. The method includes transmitting, by the first node, a second message to the second node if the deadline has not passed and the first node has information related to the content. The second message indicates the first node has the information related to the content. The method includes transmitting, by the first node, a third message to the second node if the deadline has passed. The third message includes a list of nodes that have one or more other nodes associated with the peer-to-peer network.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION OF THE EMBODIMENTS

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks are stored in a machine or computer readable medium such as a storage medium. A processor(s) performs the necessary tasks.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and will be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

The terms "peer" and "node" are used interchangeably throughout this disclosure. Generally, a peer refers to the physical hardware within the peer-to-peer network. A peer may also be a node. However, a node may also more generally refer to a logical instance of, for example a file location (e.g., address or reference in a table) within the peer-to-network.

Figure 2:
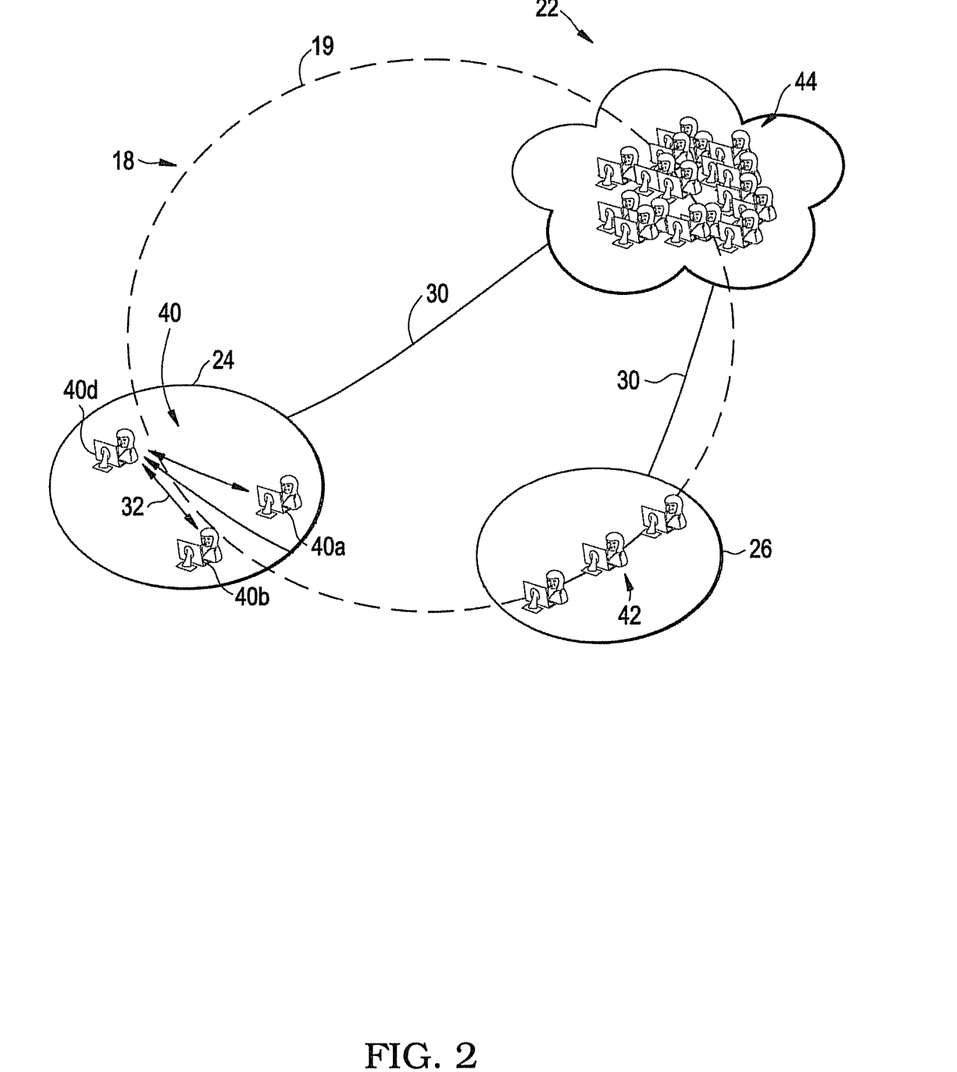
FIG. 2 illustrates a schematic diagram of a peer-to-peer file sharing network utilizing a distributed hash table (DHT) in accordance with example embodiments.

FIG. 2 is a schematic diagram of a peer-to-peer network 18 in accordance with an example embodiment. In the peer-to-peer network 18 shown in FIG. 2, there is no central computer 14. While not shown, it should be understood that peers 40, are connected by connections to each other.

FIG. 2 shows a peer-to-peer file sharing network 18. The network 18 of FIG. 2 does not rely on centralized components to list the network contents, but rather uses a uses a distributed hash table (DHT) 19 to distribute the directory database to all participating clients. The DHT 19 is represented in FIG. 2 as a broken line connecting all aspects of the network 18 together.

The file sharing network 18 includes a first internet service provider (ISP) 24 and a second ISP 26. Within the ISP 24 are various clients, which may also be referred to as peers, nodes or users 40. The various clients, peers or users will be distinguished from amongst other peers on the same ISP by adding a letter behind the reference numeral.

A second ISP 26 is also shown having various peers 42. The first ISP 24 and the second ISP 26 may be connected together via a peering link 28.

The Internet at large 22 is illustrated in FIG. 2. ISP 24 may be connected to the internet at large 22 by a transit link 30. A transit link 30 may also connect ISP 26 to the internet at large 22. Peers located on the internet at large 22 are identified by reference number 44. Like the peers 40 and 42, the peers 44 on the Internet at large 22 are associated with at least one ISP. However the ISP's associated with the peers 44 on the Internet at large 22 are not shown.

Due to the amount of resources (for example, peering links 28 or transit links 30) needed for sharing files between peers 40, 42, 44 associated with different ISPs 24, 26, it may be preferred, whenever possible, to have peers within a particular ISP share files amongst each other rather than sharing files between peers located on different ISPs.

The arrows 32 illustrate a preferred way of file sharing where the peers 40a, 40b, and 40d share files between each other. All of the peers 40a, 40b, and 40d are located on the ISP 24. There may be some situations that develop where a peer 40 located within an ISP 24 requests a file that is not contained by any peer also located on ISP 24. Therefore, in order to obtain the requested content, the peer 40 must obtain content from a user located either in ISP 26 or the internet at large 22.

Figure 3:
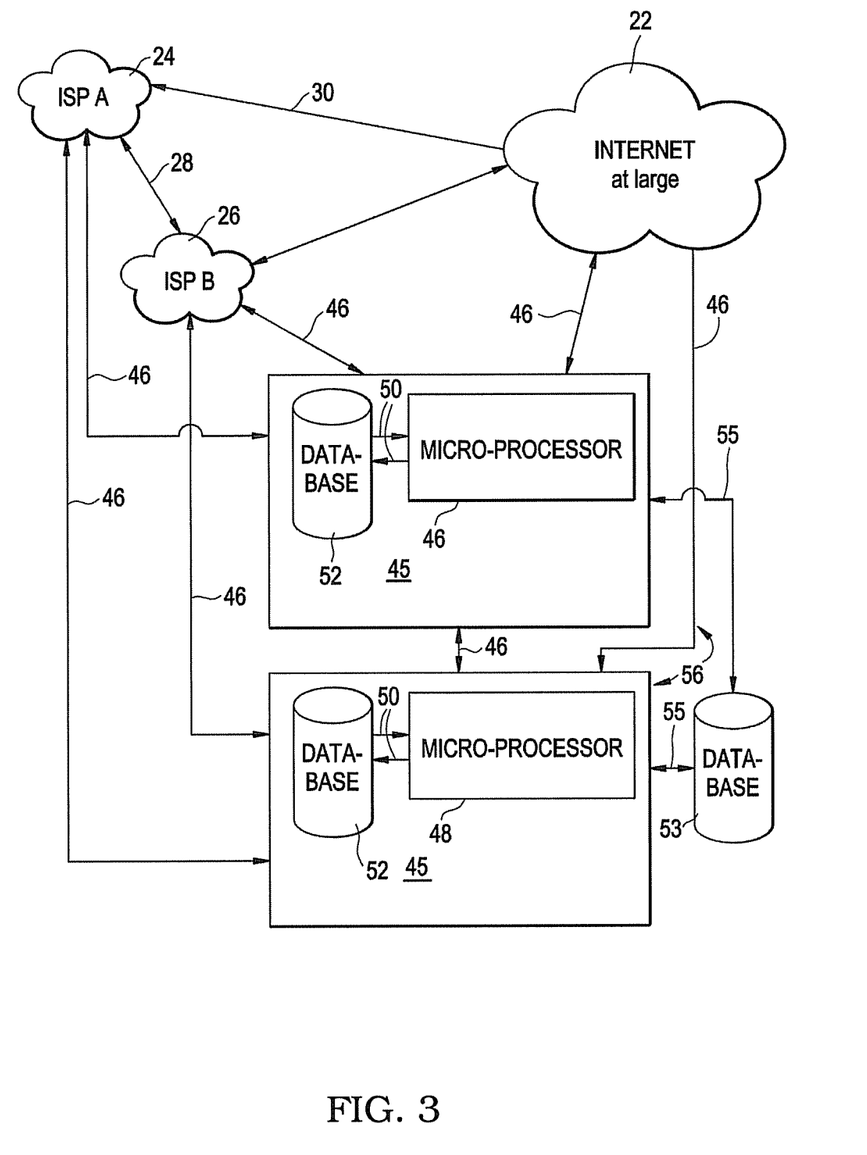
FIG. 3 illustrates a schematic diagram of a file sharing network in accordance with example embodiments and illustrates various components of a computer in communication with the file sharing network.

FIG. 3 is a schematic diagram illustrating various ISPs 24, 26, the internet at large 22, and network components (which may also be referred to as computers, or network elements). The network elements 45 may be distributed throughout the network as shown above with regard to FIG. 2. For example, in peer-to-peer file sharing networks, such a file sharing network 18 that has no centralized computer 14, but rather uses a DHT 19, the computer or network elements 45 may be distributed throughout the file sharing network. Alternatively, the network elements 45 may be merely connected with the various ISPs 24 and 26, and the Internet at large 22 via connections 46.

As shown in FIG. 3, the network elements 45 may include one or more micro processors 48 connected via connections 50 to a database 52. The network elements 45 may also be operatively connected to another database 53 via connections 55. The database 53 may be searchable and may be able to provide information to the network elements 45 such as what ISP is associated with a given peer as explained in more detail later below.

In some embodiments of the invention, the network elements 45 may be already existing system components connected to the network. Existing network elements 45 may be programmed to perform the functions described herein. For example, existing networks may include network components programmed to perform the function described herein. In other embodiments, the network elements 45 may be added to the network (rather than existing network components) and configured to pedal in the functions described herein.

The terms peer and node are used interchangeably below. Typically the term peer refers to a physical entity (e.g., computing device) in the peer-to-peer network. Typically the term node refers to both logical (e.g., stored content) and physical entities (e.g., computing device) in the peer-to-peer network. The terms logical identities, keys and/or controlled peers typically refer to logical entries in a DHT (e.g., DHT 19).

The DHT may store entries as a <key, value> pairing, where the key is the result of a hash function and the value is some information regarding the entry in the DHT 19. For example, the value may be a node identification or name, information about the network or information about the content. Information regarding the file or content may be, for example, the address of the peer hosting that file or content, the value may also include a name of the file, a pointer to a memory location of the file on the peer storing the file or a type of file (e.g., video, audio, program).

The hash function may be performed on, for example, infatuation associated with a node and/or content. In example embodiments, a node or peer (e.g., peer 40*a*) may have a unique identifier or key and a file or content may have a unique identifier or key.

As is known, in traditional peer-to-peer networks using a DHT (e.g., DHT 19), a peer that has a content and wants to share the content simply announces the content to the k (typically 10) peers in the DHT whose identifiers (e.g., logical identity or key associated with the peer) are closest to the peers identifier.

A peer that wants to download the content, requests to the closest known (e.g., stored in DHT 19) peers of the peer that has the content. The closest known peers return an address of the peer that has the content to the peer that wants to download the content. Subsequently, the peer that wants to download the content starts downloading the content from the peer that has the content.

For example, as described above, one well known file sharing system for peer-to-peer networks is known as BIT-TORRENT. The BITTORRENT file sharing system uses the get_peer object to make a content request. A peer sends get_peer messages to the k peers whose node identifications the peer is already aware of.

As is known, peers in a BITTORRENT file sharing system respond with messages of other known peers. For example, if the responding peer does not know of any peers including the content, the responding peer replies with a list of known peers that the requesting peer may send a message to in a next iteration, peers which identifiers are closer to the identifier of the requested file. As is known, this iterative process repeats until the get_peer message is replied to with a list of peers that hold a copy or a portion of the requested content. The list of peers may include, for example an address of the peer and a port number to access the content through.

As one skilled in the art will appreciate, the above BITTORRENT example does not take into consideration any network relationships between the requesting peer and the peer having the content. The requesting peer downloads the content from the first peer the requesting is made aware of as having the content. Therefore, peers can download content from any other peer regardless their physical location in the network. As a consequence, peer-to-peer networks generate large amount of traffic on the transit links increasing costs to the network operators.

If the peer-to-peer network implements traffic localization, the addresses returned to a content request are ordered by their network distance to the requester. IP addresses from the same ISP of the requester being on top of the list.

To reduce the large amount of transit traffic that peer-to-peer applications currently generate. Example embodiments introduce the term of "delay tolerance" to the lexicon of peer-to-peer applications. Delay tolerance defines a certain delay in the retrieval of a file that a user may tolerate. For example, a user might start a download of a movie late in the evening expecting the download to be ready for the next day, when the user wants to enjoy the movie.

Example embodiments use this delay tolerance to improve traffic localization in peer-to-peer networks. A file download may be delayed (up to the user tolerable delay) if the file is not locally available. In this way, the probability increases that another peer within the ISP of the requester does have the requested content.

Figure 4A:
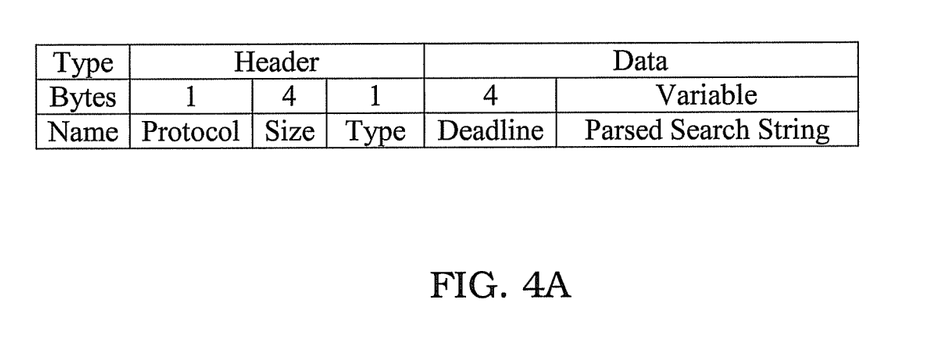
FIGS. 4A and 4B illustrate data packets according to example embodiments.

FIGS. 4A and 4B illustrate data packets according to example embodiments. As shown in FIG. 4A a data packet may include a header including protocol, size and type fields. The data packet may also include a data section including deadline and parsed search string fields. The data packet of FIG. 4A may be, for example, a TCP message data packet.

The protocol field may be one byte in size and include an indication of the protocol used for file sharing. For example, the indicator may indicate a protocol such as eMule or eDonkey™, registered to MetaMachine, Inc.

The size field may be four bytes in size and include an indication of the size of the data packet/message in bytes. The type field may be one byte in size and include an indication of the type of data packet/message. For example, the indicator may indicate a type such as search request, search result, login, server or ID change.

The deadline field may be four bytes in size and include an indication of the time at which content is required by. For example, the deadline may indicate a delay tolerance (as described above) defining a certain delay in the retrieval of a file that a user may tolerate.

The parsed search string field may be variable in size and include an indication of the requested content. For example, as is known, the parsed search string may include indications of the requested content. The parsed search string may include Boolean conditions such 'AND', 'OR' and 'NOT' to exclude or expand the search for content. A user may specify required file type and size and also set an availability threshold (e.g. show me results that are available from at least 5 other clients)

Figure 4B:
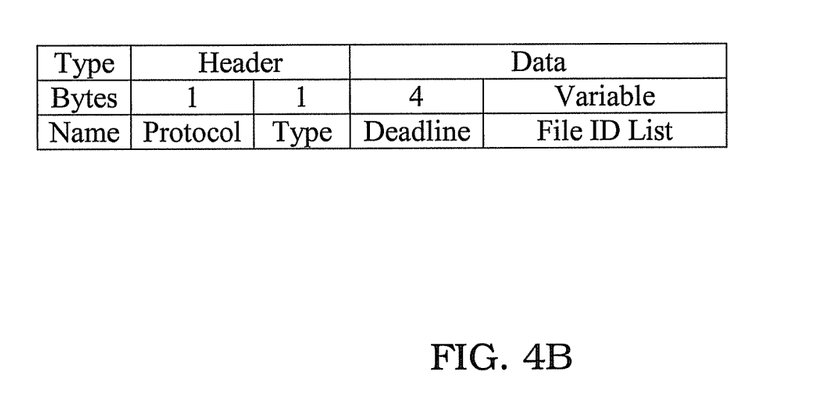

As shown in FIG. 4B a data packet may include a header including protocol and type fields. The data packet may also include a data section including deadline and file ID list fields. The data packet of FIG. 4B may be, for example, a UDP message data packet.

The protocol field may be one byte in size and include an indication of the protocol used for file sharing. For example, the indicator may indicate a protocol such as eMule or eDonkey. The type field may be one byte in size and include an indication of the type of data packet/message. For example, the indicator may indicate a type such as search request, search result, get sources or found sources.

The deadline field may be four bytes in size and include an indication of the time at which content is required by. For example, the deadline may indicate a delay tolerance (as described above) defining a certain delay in the retrieval of a file that a user may tolerate.

The file ID list field may be variable in size and include an indication of the requested content. For example, the file ID list may include indications of the file ID for one or more requested contents. A file ID may be calculated by hashing a file's data.

As one skilled in the art will recognize, data packets as described with reference to FIGS. 4A and 4B may be varied in many ways based on, for example, the messaging protocol or the file sharing protocol. Example embodiments are not limited to the data packets of FIGS. 4A and 4B.

FIGS. 5A-5D illustrate a flow chart of a method for localizing traffic in a peer-to-peer network according to an example embodiment. While describing the steps of the method associated with FIGS. 5A and 5B, reference will be made to the networks of FIG. 2 and FIG. 3 and the data packets shown in FIGS. 4A and 4B.

Figure 5A:
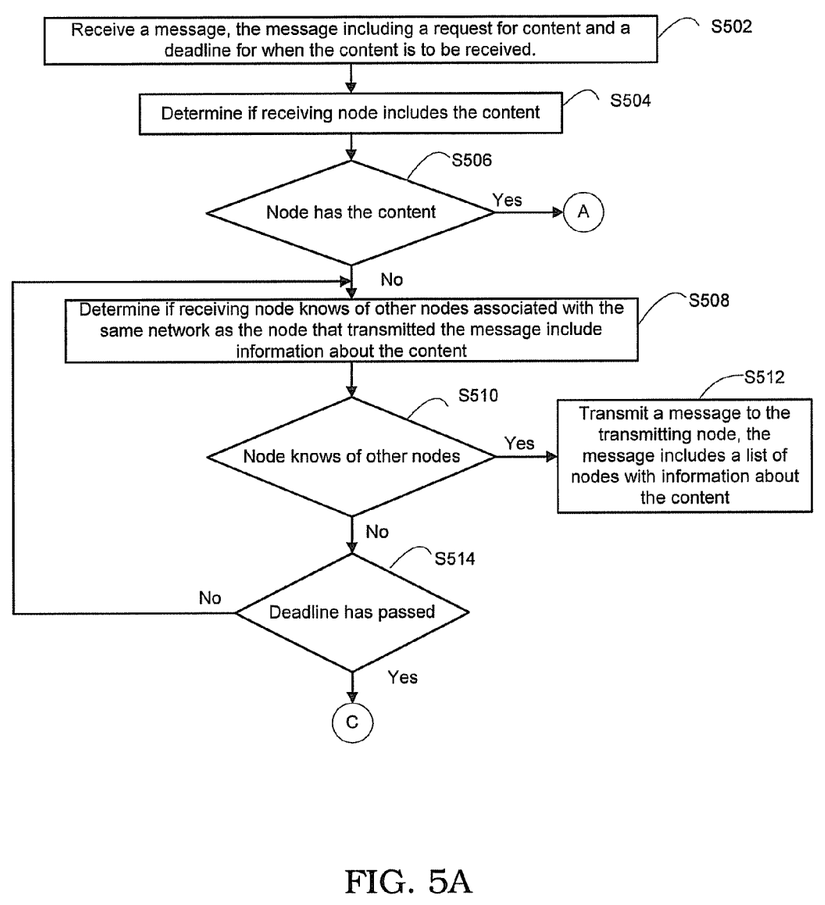
FIGS. 5A-5D illustrate a flow chart of a method for localizing traffic in a peer-to-peer network according to an example embodiment.

Referring to FIG. 5A, in step S502 a request message is received. For example, the request message may be the message described in more detail below with regard to FIG. 6A. The request message may include a request for content and a deadline for when the content is to be received. For example, the request message may have an associated data packet as shown above in FIG. 4A. Referring to FIG. 4A, the deadline field may include a time value indicating the deadline for when the content is to be received by. The time value may indicate a date and time the content is to be received by. Alternatively, the time value may be a value used to calculate the date and time the content is to be received by.

In step S504, the receiving node determines if the receiving node includes the content based on the request message. For example, the response message may include a field indicating the responding node includes at least a portion of the content. And the transmitted response message may include a field indicating the responding node is to transmit the content to the peer. Other processes for determining if the receiving node includes the content and transmitting a response message including an indication of the content are known to those skilled in the art and will not be discussed further for the sake of brevity. However, because the receiving node and the requesting node are associated with the same network, traffic is localized according to example embodiments.

In step S506, if the receiving node has the content processing continues to step S520. Otherwise, processing continues to step S508.

If the receiving node does not have the content in step S504, then, in step S508, the receiving node determines if receiving node knows of other nodes associated with the same network (e.g., the same ISP) as the node that transmitted the message includes information about the content. In step S510, if the receiving node knows of other nodes associated with the network that include information about the requested content, in step S512, the receiving node transmits a response message to the requesting node. The response message includes a list of nodes with information about the content. Otherwise, processing continues to step S514.

For example, in step S508 a list of nodes is filtered based on the requesting nodes ISP. The filtered list of nodes may include only those nodes that are associated with a same ISP as the requesting node. The filtered list of nodes may also include nodes with relatively good quality and/or relatively inexpensive connectivity (e.g. peering agreements) with respect to the requestor. In step S512 the requesting node is replied to with a response message including a peer-set or list of nodes based on the filtered list of nodes.

For example, in step S510, micro-processor 46 may determine that the requesting node is a member of network 24. In addition, micro-processor 46 may determine that computers 3, 4 and 7 are members of network 24. According to example embodiments, the local peer-set or list of nodes of step S508 will include computers 3, 4 and 7 and not include computers of other networks. In step S512, micro-processor 46 may transmit a response message including the list of computers 3, 4 and 7.

If in step S514, the deadline as described above has passed, processing continues to step S540. Otherwise, processing returns to step S508.

Figure 5B:
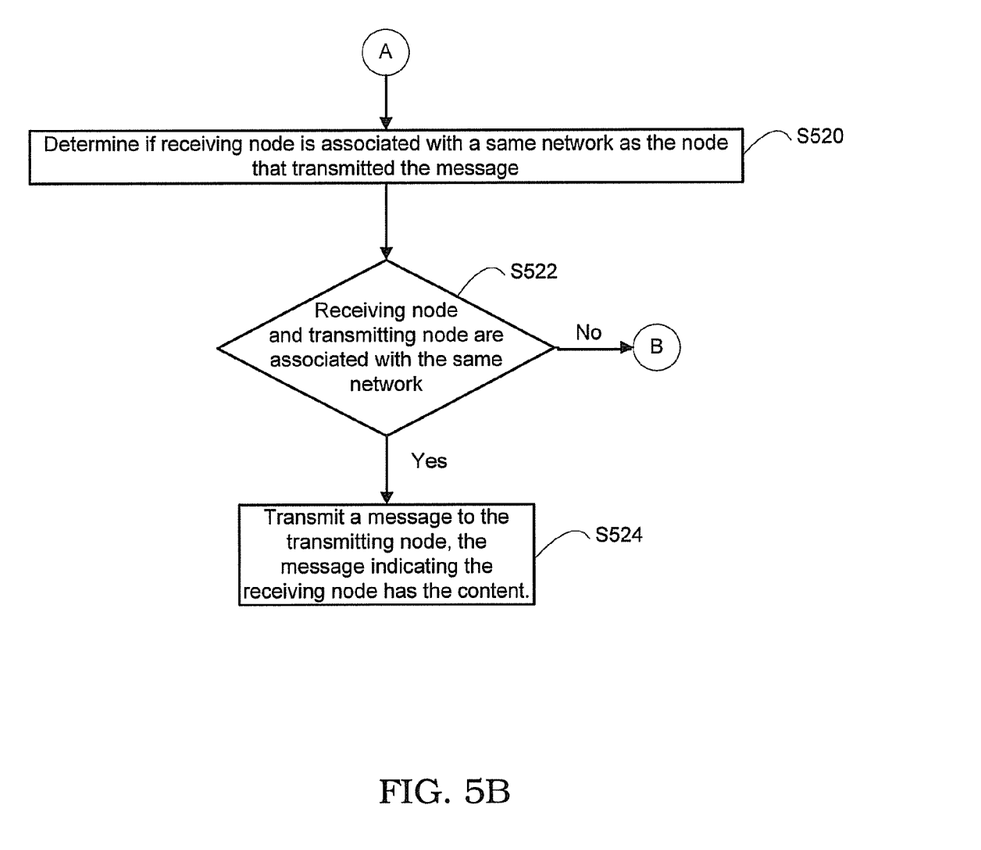

Referring to FIG. 5B, in step S520 the receiving node determines if the receiving node is associated with a same network as the requesting node (the node that transmitted the request message). For example, initially an ISP associated with the requesting node may be determined. For example, micro-processor 46 may make a comparison of an address associated with the requesting node with network information retrieved from database 53. Alternatively and/or in addition to, micro-processor 46 may use information read from the DHT 19. For example, micro-processor 46 may use information stored in the value field associated with the requesting node.

Once the network associated with the requesting node is determined, micro-processor 46 may make a comparison of the network associated with the requesting node and a network associated the node that received the request message to determine if the networks are the same. For example, the networks may be the same if the networks are a same internet service provider (ISP) network.

The parsed search string may be a string indicating the content. As described above, a parsed search string indicating content is known to those skilled in the art. For example, the request message may be a BITTORRENT get_peer message as described above.

In step S522, if the receiving node and requesting node are not associated with the same network (as determined in step S520), processing moves to step S530. Otherwise, processing continues to step S524.

In step S524, the receiving node transmits a response message to the requesting node. The response message indicates the receiving node has the content. For example, the response message may include a field indicating the responding node includes at least a portion of the content. And the transmitted response message may include a field indicating the responding node is to transmit the content to the peer. Other processes for determining if the receiving node includes the content and transmitting a response message including an indication of the content are known to those skilled in the art and will not be discussed further for the sake of brevity. However, because the receiving node and the requesting node are not associated with the same network, traffic is not localized because receiving node is not associated with the same network as the requesting node.

Figure 5C:
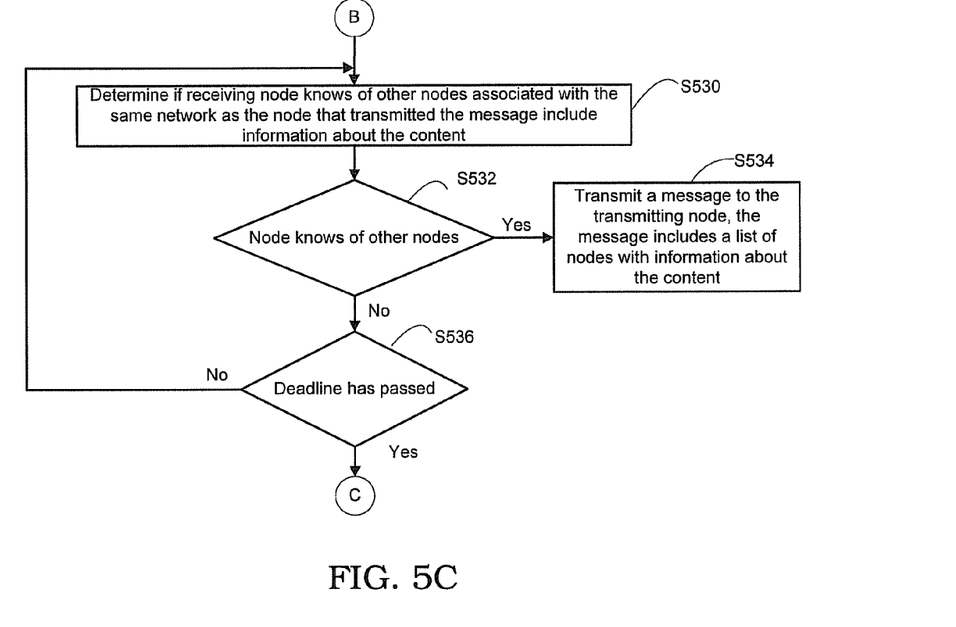

Referring to FIG. 5C, in step S530 the receiving node determines if receiving node knows of other nodes associated with the same network (e.g., the same ISP) as the node that transmitted the message includes information about the content. In step S532, if the receiving node knows of other nodes associated with the network that include information about the requested content, in step S534, the receiving node transmits a response message to the requesting node. The response message includes a list of nodes with information about the content. Otherwise, processing continues to step S536.

For example, in step S530 a list of nodes is filtered based on the requesting nodes ISP. The filtered list of nodes may include only those nodes that are associated with a same ISP as the requesting node. The filtered list of nodes may also include nodes with relatively good quality and/or relatively inexpensive connectivity (e.g. peering agreements) with respect to the requestor. In step S534 the requesting node is replied to with a response message including a peer-set or list of nodes based on the filtered list of nodes.

For example, in step S532, micro-processor 46 may determine that the requesting node is a member of network 24. In addition, micro-processor 46 may determine that computers 3, 4 and 7 are members of network 24. According to example embodiments, the local peer-set or list of nodes of step S530 will include computers 3, 4 and 7 and not include computers of other networks. In step S534, micro-processor 46 may transmit a response message including the list of computers 3, 4 and 7.

If in step S536, the deadline as described above has passed, processing continues to step S540. Otherwise, processing returns to step S530.

Figure 5D:
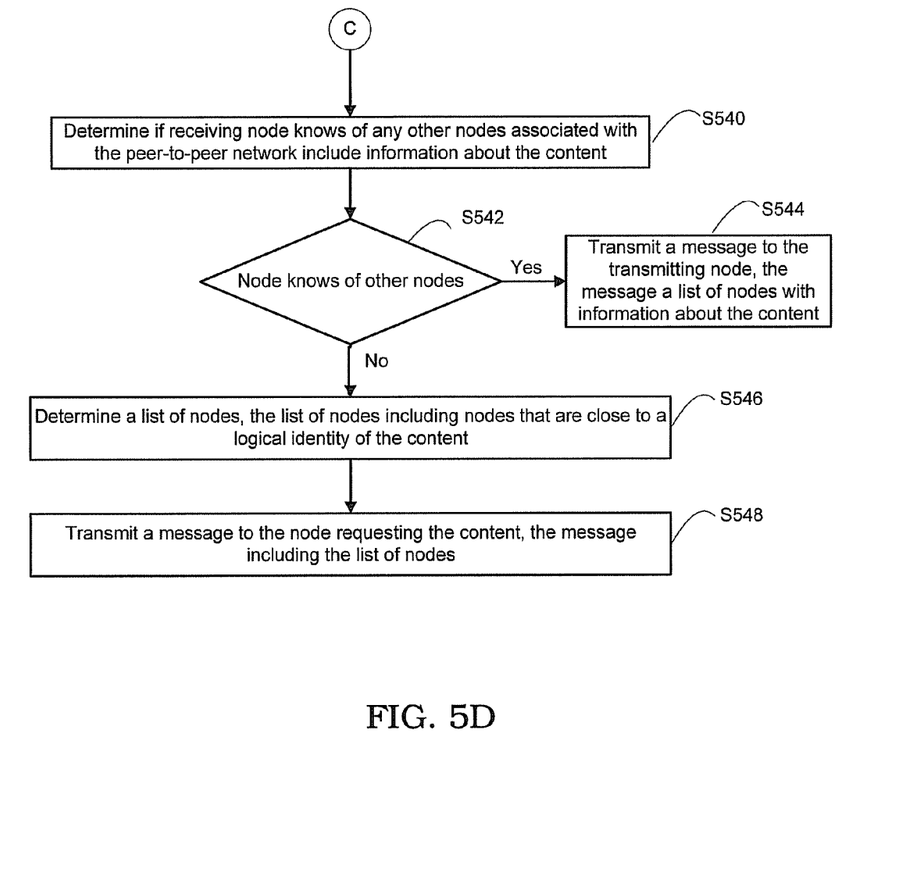

Referring to FIG. 5D, in step S540, the receiving node determines if the receiving node knows of other nodes associated with the network (e.g., the ISP) include information about the requested content. In step S542, if the receiving node knows of other nodes associated with the network that include information about the requested content, in step S544, the receiving node transmits a response message to the requesting node. The response message includes a list of nodes with information about the content. Otherwise, processing continues to step S546.

For example, in step S540 the list of nodes is not as described above with regard to steps S508 and S530. Therefore, in step S544 the requesting node is replied to with a response message including a peer-set or list of nodes with no distinctions based on a network.

In step S546, a list of nodes is determined based on a nodes proximity to a logical identifier (key) of the content. The list of nodes includes nodes that are close to a logical identity of the content. In step S548, a response message is transmitted to the node requesting the content, the response message including the list of nodes based on a nodes proximity to a logical identifier (key) of the content. For example, the response message may include a field indicating the responding node includes at least a portion of the content. And the transmitted response message may include a field indicating the responding node is to transmit the content to the peer. Other processes for determining a list of nodes based on a nodes proximity to a logical identifier of the content and transmitting the list are known to those skilled in the art and will not be discussed further for the sake of brevity.

Figure 6A:
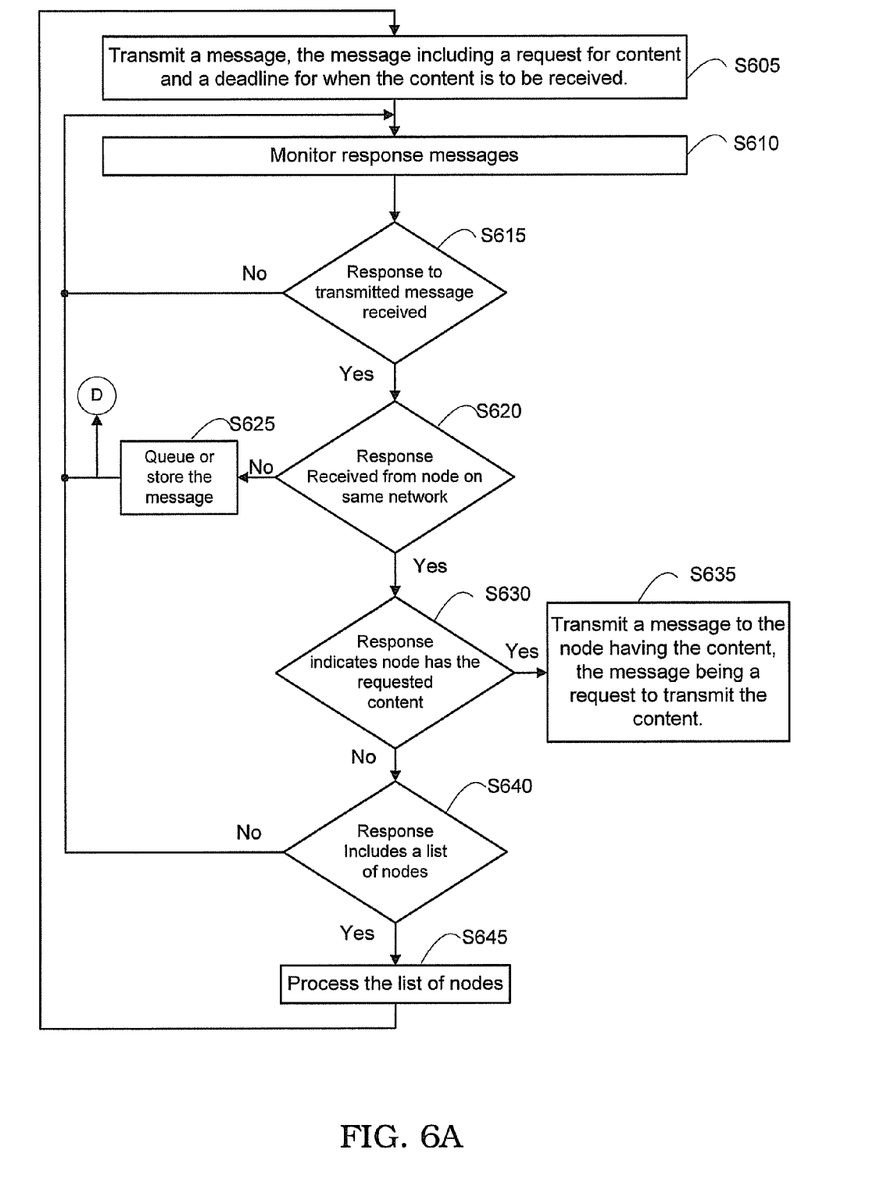
FIGS. 6A and 6B illustrate a flow chart of another method for localizing traffic in a peer-to-peer network according to an example embodiment.
Figure 6B:
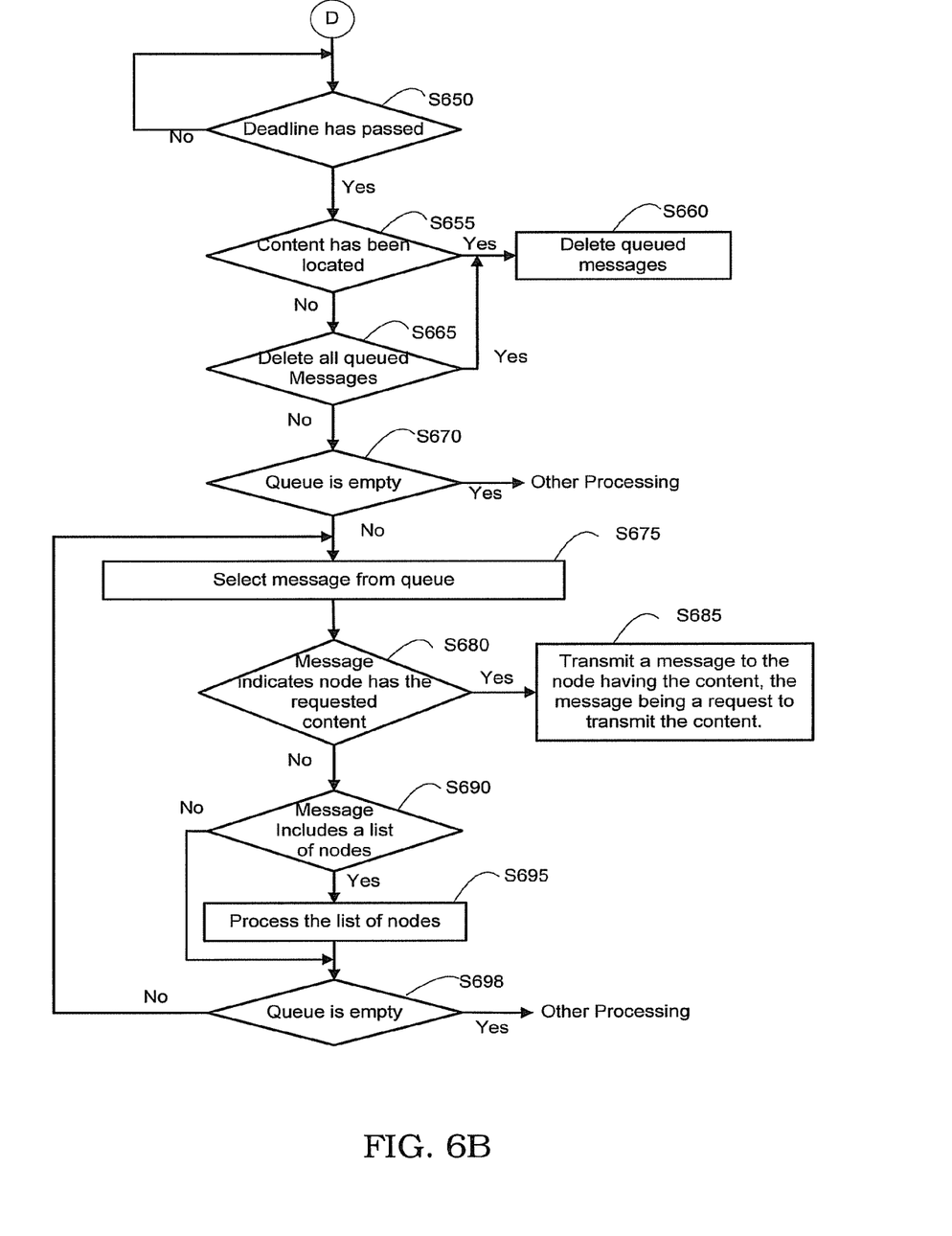

FIGS. 6A and 6B illustrate a flow chart of another method for localizing traffic in a peer-to-peer network according to an example embodiment. While describing the steps of the method associated with FIGS. 6A and 6B, reference will be made to the networks of FIG. 2 and FIG. 3 and the data packets shown in FIGS. 4A and 4B.

Referring to FIG. 6A, in step S605, a message is transmitted. The message may include a request for content and a deadline for when the content is to be received by. For example, the message may have an associated data packet as shown above in FIG. 4A. Referring to FIG. 4A, the deadline field may include a time value indicating the deadline for when the content is to be received by. The time value may indicate a date and time the content is to be received by. Alternatively, the time value may be a value used to calculate the date and time the content is to be received by.

The parsed search string may be a string indicating the content. As described above, a parsed search string indicating content is known to those skilled in the art. For example, the message may be a BITTORRENT get_peer message as described above.

In step S610, response messages are monitored. In step S615, it is determined if the response messages are messages received in response to a transmitted message. If a response message is received in response to the transmitted message, processing continues to step S620. Otherwise, processing returns to step S610. Monitoring messages and determining if a response message is associated with a transmitted message are known to those skilled in the art and will not be discussed further for the sake of brevity.

In step S620, the peer determines if the response message is received from a node associated with the same network as the peer. For example, an address associated with the response message may be compared to an address associated with the peer. If both address are associated with the same network (e.g., an internet service provider (ISP) network), the node and the peer may be determined to be associated with the same network. If the response message is received from a node associated with the same network as the peer processing continues to step S630. Otherwise, processing moves to step S625 and the message is queued or stored. For example, the message may be queued or stored in a memory location associated with database 52. The message may be queued or stored in relation to the message transmitted in step S605. The message may be queued or stored in order to perform some future processing. For example, the queued or stored message may be processed as described below with regard to FIG. 6B. After the message is queued or stored, processing returns to step S610.

In step S630, the peer determines if the response message indicates the responding node has the requested content. If, in step S630, the responding node has the requested content, in step S635 a message is transmitted to the responding node having the content. The message may be a request to transmit the content. Otherwise processing moves to step S640. For example, the response message may include a field indicating the responding node includes at least a portion of the content. And the transmitted message may include a field indicating the responding node is to transmit the content to the peer. Other processes for determining if the response message indicates the responding node has the requested content and requesting the content are known to those skilled in the art and will not be discussed further for the sake of brevity.

In step S640, the peer determines if the response message includes a list of nodes. If the response message includes a list of nodes, processing continues to step S645. Otherwise, processing returns to step S610. In step S645, the list of nodes is processed and processing returns to step S605. For example, the message may include a field indicating the message includes a list of nodes. The peer may the read the list of nodes and transmit messages to the nodes in the list as described above with regard to step S605. Other processes for determining if the response message includes a list of nodes and processing a list of nodes are known to those skilled in the art and will not be discussed further for the sake of brevity.

FIG. 6B illustrates a flow chart of a method for processing queued or stored messages by a peer in a peer-to-peer network according to example embodiments. The queued or stored messages may be messages stored in step S625 described above.

Referring to FIG. 6B, in step S650, the peer determines if a deadline, as described above, has passed. If the deadline has passed, processing continues to step S655. Otherwise, processing loops at step S650. As described above, processing moves to step S650 (and loops) because the receiving node and requesting node are not associated with the same network. Therefore, no action is performed by the receiving node if the receiving node and requesting node are not associated with the same network. No action is performed until after the deadline has passed in step S650. Therefore, traffic localization in the peer-to-peer network (e.g., network 24) is improved.

In step S655, the peer determines if the content has been located. For example, the client associated with the peer may store an indicator informing the peer that the content has been located. Other processes for determining if the content has been located are known to those skilled in the art and will not be discussed further for the sake of brevity. If the content has not been located, processing continues to step S665. Otherwise, processing moves to step S660. In step S665, the peer determines if all queued or stored messages are to be deleted. For example, a client application may include a setting to only locate content associated with a local network. The setting may be associated with a content request or may be a general setting associated with all content requests. If the setting indicates content should be requested from the local network, the peer may determine to delete all queued or stored messages. If all queued or stored messages are to be deleted, processing moves to step S660. Otherwise, processing continues to step S670.

In step S660, the queued or stored messages are deleted. For example, the messages may be queued or stored in a memory location associated with database 52. The message may be queued or stored in relation to the message transmitted in step S605 (described above). In step S660, the messages associated with the message transmitted in step S605 may be deleted from database 52.

In step S670, the peer determines if the queue is empty. For example, the peer may query database 52 to determine if there are any messages associated with the message transmitted in step S605. If the queue is empty processing proceeds to some other processing. If the queue is not empty, processing continues to step S675 where a message is selected from the queue. For example, a message from the query of database 52 is selected.

In step S680, the peer determines if the selected message indicates the responding node has the requested content. If, in step S680, the responding node has the requested content, in step S685 a message is transmitted to the responding node having the content. The message may be a request to transmit the content. Otherwise processing moves to step S690. For example, the response message may include a field indicating the responding node includes at least a portion of the content. And the transmitted message may include a field indicating the responding node is to transmit the content to the peer. Other processes for determining if the response message indicates the responding node has the requested content and requesting the content are known to those skilled in the art and will not be discussed further for the sake of brevity.

In step S690, the peer determines if the selected message includes a list of nodes. If the response message includes a list of nodes, processing continues to step S695. Otherwise, processing moves to step S698. In step S695, the list of nodes is processed and processing continues to step S698. For example, the message may include a field indicating the message includes a list of nodes. The peer may the read the list of nodes and transmit messages to the nodes in the list as described above with regard to step S605. Other processes for determining if the response message includes a list of nodes and processing a list of nodes are known to those skilled in the art and will not be discussed further for the sake of brevity.

In step S698, the peer determines if the queue is empty. For example, the peer may query database 52 to determine if there are any messages associated with the message transmitted in step S605. If the queue is empty processing proceeds to some other processing. If the queue is not empty, processing returns to step S675.

The steps of the method illustrated in FIGS. 6A and 6B may be iteratively repeated until all of the requested content is requested and downloaded to the requesting peer.

Traffic localization in a peer-to-peer network based on the example embodiments of FIGS. 5A, 5B, 6A and 6B may be implemented by modifying the client applications that perform file sharing (e.g., the BITTORRENT file sharing system).

Alternative embodiments of the invention may be implemented as a computer program product for use with a computer system, the computer program product being, for example, a series of computer instructions, code segments or program segments stored on a tangible or non-transitory data recording medium (computer readable medium), such as a diskette, CD-ROM, ROM, or fixed disk, or embodied in a computer data signal, the signal being transmitted over a tangible medium or a wireless medium, for example, microwave or infrared. The series of computer instructions, code segments or program segments can constitute all or part of the functionality of the methods of example embodiments described above, and may also be stored in any memory device, volatile or non-volatile, such as semiconductor, magnetic, optical or other memory device.

While example embodiments have been particularly shown and described, it will be understood by one of ordinary skill in the art that variations in form and detail may be made therein without departing from the spirit and scope of the claims.

The invention being thus described, it will be obvious that the same may be varied in many ways. Such variations are not to be regarded as a departure from the invention, and all such modifications are intended to be included within the scope of the invention.

We claim:

1. A method, comprising:
   transmitting, by a first node of a peer-to-peer network, a first message to at least one node of a plurality of nodes associated with the peer-to-peer network, the message including a request for content and a deadline for when the content is to be received by the first node, the first message includes a data packet, the data packet having a plurality of fields, the plurality of fields including a first field indicating the request for content and a second field indicating the deadline; and
   receiving, by the first node, a second message from a second node of the plurality of nodes, the second message including a list of at least one other node of the plurality of nodes that has information about the requested content if the second node does not have the requested content, the list being based on a logical identifier of the requested content,
      the list of the second message is a filtered list, filtered by at least one criteria if the deadline has not passed, and
      the list of the second message is an unfiltered list if the deadline has passed.

2. The method of claim 1, further comprising:
   receiving a second message from a second node, the second node being one of the one or more other nodes of the plurality of nodes;
   determining if the second node is associated with a same network as the first node based on the second message; and
   storing the second message if the node is not associated with the same network as the first node.

3. The method of claim 2, further comprising:
   determining if the deadline has passed;
   determining if the content has been received; and
   one of deleting the second message if the content has been received and processing the second message if the content has not been received.

4. The method of claim 3, wherein processing the second message includes,
   determining if the second message indicates the second node includes at least a portion of the content, and
   transmitting a third message to the second node, the third message requesting the second node to transmit the content to the first node if the second node includes at least a portion of the content.

5. The method of claim 3, wherein processing the second message includes,
   determining if the second message includes a list of nodes, and
   transmitting, a third message to one or more nodes associated with the list of nodes, the third message including the request for content and the deadline.

6. The method of claim 1, further comprising:
   receiving a second message from a second node, the second node being one of the one or more other nodes of the plurality of nodes, the second message indicating the second node includes at least a portion of the content; and
   transmitting a third message to the second node, the third message requesting the second node to transmit the content to the first node.

7. The method of claim 1, further comprising:
   receiving a second message from a second node, the second node being one of the one or more other nodes of the plurality of nodes, the second message including a list of nodes; and
   transmitting, a third message to one or more nodes associated with the list of nodes, the third message including the request for content and the deadline.

8. A method, comprising:
   receiving, by a first node of a peer-to-peer network, a first message from a second node associated with the peer-to-peer network, the first message including a request for content and a deadline for when the content is to be received, the first message including a data packet having a plurality of fields, the plurality of fields including a first field indicating the request for content and a second field indicating the deadline;
   transmitting, by the first node, a second message to the second node if the deadline has not passed and the first node has information related to the content, the second message indicating the first node has the information related to the content, the second message including a list of at least one other node associated with the peer-to-peer network having information about the requested content if the first node does not have the requested content, the list being based on a logical identifier of the requested content,
      the list of the second message is a filtered list, filtered by at least one criteria if the deadline has not passed; and
      the list of the second message is an unfiltered list if the deadline has passed; and
   transmitting, by the first node, a third message to the second node if the deadline has passed, the third message including a first list of nodes that have one or more other nodes associated with the peer-to-peer network.

9. The method of claim 8, wherein the first message includes a data packet, the data packet having a plurality of fields, the plurality of fields including a first field indicating the request for content and a second field indicating the deadline.

10. The method of claim 8, wherein information related to the content includes one of an indication that the first node has at least a portion of the content and a second list of nodes, the second list of nodes being associated with a same network as the second node.

11. The method of claim 10, wherein the second list of nodes includes nodes associated with the peer-to-peer network that are closer to the content.

12. The method of claim 10, wherein the same network is associated with an internet service provider.

13. The method of claim 8, wherein the first list of nodes are associated with a different network as the second node.

14. The method of claim 13, wherein the first list of nodes includes nodes associated with the peer-to-peer network that are closer to the content.

15. The method of claim 13, wherein the different network is an internet service provider network not associated with the second node.

* * * * *